United States Patent [19]

Younger

[11] 4,084,522
[45] Apr. 18, 1978

[54] APPARATUS AND METHOD FOR SOWING SECOND CROP IN STANDING CROP

[76] Inventor: Lloyd Younger, 215 N. Church St., Bethany, Ill. 61914

[21] Appl. No.: 619,202

[22] Filed: Oct. 3, 1975

[51] Int. Cl.² .............................................. A01C 5/06
[52] U.S. Cl. ...................................... 111/14; 111/52; 111/86; 111/DIG. 1; 180/1 F; 180/44 F
[58] Field of Search .................... 111/1, 14, 17, 18, 19, 111/63, 85, 86, 87, 88, 76, 78, 80, 52, DIG. 1; 180/44 D, 44 F, 1 F; 172/105, 106, 125; 47/1

[56] References Cited

U.S. PATENT DOCUMENTS

| 258,928 | 6/1882 | Keith | 111/14 |
| 928,452 | 7/1909 | Houghland | 111/1 |
| 2,619,361 | 11/1952 | Connors et al. | 180/1 F |
| 2,675,750 | 4/1954 | Boyer | 172/125 |
| 3,060,873 | 10/1962 | Powers | 111/80 |
| 3,154,164 | 10/1964 | Shaw et al. | 180/44 F |
| 3,747,267 | 7/1973 | Paulk et al. | 47/1 |
| 3,841,245 | 10/1974 | Tye | 111/85 |

FOREIGN PATENT DOCUMENTS 38,965 4/1909 Austria ..................... 111/1

OTHER PUBLICATIONS

Singh, J. N. et al., "Study on the Intercropping of Soybean with AAA12E, and Jowar, *The Indian Journal of Agronomy* vol. 18, No. 1, Mar. 1973, pp. 75-78, published by The Indian Society of Agronomy, New Delhi.
Wiggans, R. G. 1935, "Pole Beans vs. Soybeans as a Companion Crop with Corn for Silage" *Journal of the American Society of Agronomy*, vol. 27, pp. 154-158.
Hughes, H. D. 1931, "Soybean-Corn Mixtures" *Journal of the American Society of Agronomy*, (Abstract) vol. 23, p. 1064.
Wiggans, R. G. 1934, "The Effect of Growing Corn and Soybeans in Combination on the Percentage of Dry Matter in the Two Crops." *Journal of the American Society of Agronomy*, vol. 26, 1934, pp. 59-65.
Thompson, H. C. and W. C. Kelly *Vegetable Crops* Chapt. 11, pp. 150-153, 5th Ed., McGraw-Hill Book Co., 1957.

*Primary Examiner*—Edgar S. Burr
*Assistant Examiner*—James R. Feyrer
*Attorney, Agent, or Firm*—Julian Caplan

[57] ABSTRACT

Seeds of a second crop (e.g. soybeans) are sown in a standing grain crop (e.g. wheat). When the grain crop is ripe it is harvested by cutting with a combine at a level slightly above the top of the partially grown second crop. Seeding of the second crop is performed using a self-driven, preferably three-wheel vehicle carrying a grain drill box having flexible tubes which fit between the rows of grain and each of which discharges the seed into a gap between two downward-inward slanted discs which first cut a slit in the ground, then deposit the seed and finally cover the slit. The discs are supported and their depth controlled in such manner as to cause minimum interference with the grain.

2 Claims, 10 Drawing Figures

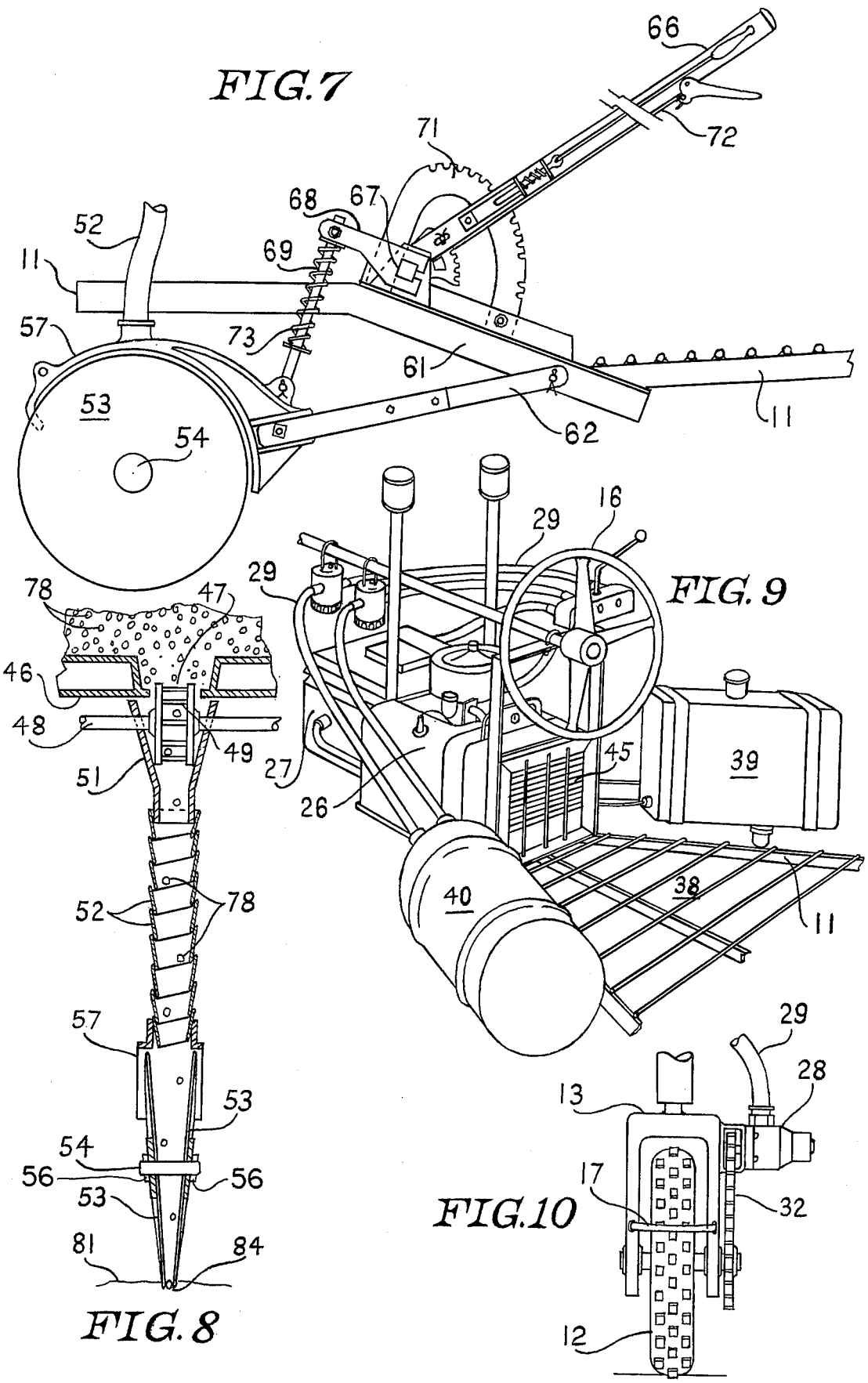

APPARATUS AND METHOD FOR SOWING SECOND CROP IN STANDING CROP

This invention relates to a new and improved apparatus and method for sowing a second crop in standing grain. More particularly, the invention relates to the use of a seed drill of particular configuration for use in practicing a method whereby two crops may be grown on the same acreage. A typical example of use of the present invention is as follows:

At present in the Middle West portion of the United States, winter wheat is sown in the Fall (e.g. October 1) and in the Spring it begins to grow. In accordance with the present invention the seeds of a second crop such as soybeans are planted between the rows of the growing wheat about June 1, for example. At this time the wheat is partially grown and the wheat has choked out any weeds starting to grow in the field. The wheat is harvested when ripe, as for example about July 4, and at this time the beans are only partially grown. The combine used to harvest the wheat is set at a level so that the wheat is cut above the tops of the beans. By this time the beans have grown tall enough and bushy enough to shade any weeds tending to grow in the field. The beans may be harvested when ripe in about October, prior to the time of planting the winter wheat for the next season.

A distinguishing feature of the present invention is the seeding of the second crop (hereinafter referred to as soybeans) into the space between the rows of the standing first crop (which may be a grain and is hereinafter referred to as wheat).

The apparatus of the present invention uses double discs which slit or cut the soil between the rows of wheat, direct the seeds falling from the seed drill into the slit and then cover the slit. The vehicle on which the seed drill is mounted has small, preferably rubber tired wheels which do a minimum of damage to the wheat.

Another feature of the invention is the fact that the wheat may be harvested with minimal damage to the bean plants.

It is, accordingly, a principal purpose of the present invention to provide for the efficient growing of two crops on the same soil with a minimum of expense and a minimum of damage to the growing first crop.

Another feature of the invention is the fact that the growing wheat protects the bean crop from weeds and hence need not be weeded while the bean plants at the time of the harvesting of the wheat are large enough to shade the adjacent ground against growth of weeds. Elimination of weeds eliminates the need to cultivate and work the ground at the time the beans are planted.

Heretofore attempts have been made to seed a second crop in a standing grain crop by dropping the seeds from airplanes or by broadcasting the seed. Such systems have proven unsatisfactory because of uneven distribution of the seed and further that the seeds are not deposited in the ground to a desired depth and hence are dependent upon subsequent rains to start germination.

Other features of the invention are the reduction in damage to the wheat during the bean planting and the reduction of damage to the beans during the wheat harvesting.

The first crop hereinafter described is specifically wheat but it will be understood that other crops which grow early in the year may be used in performance of the method hereinafter described and particularly rye and flax. Additionally, the invention describes the use of soybeans but it will be understood that other second crops may be substituted.

Other objects of the present invention will become apparent upon reading the following specification and referring to the accompanying drawings in which similar characters of reference represent corresponding parts in each of the several views.

In the drawings:

FIG. 7 is a fragmentary elevational view showing mechanism for controlling depth of planting.

FIG. 8 is an enlarged vertical sectional view of a portion of the structure of FIG. 4.

FIG. 9 is a perspective view looking forward from the operator's seat.

FIG. 10 is a front elevational view of the front wheel and its drive.

Figure 1:
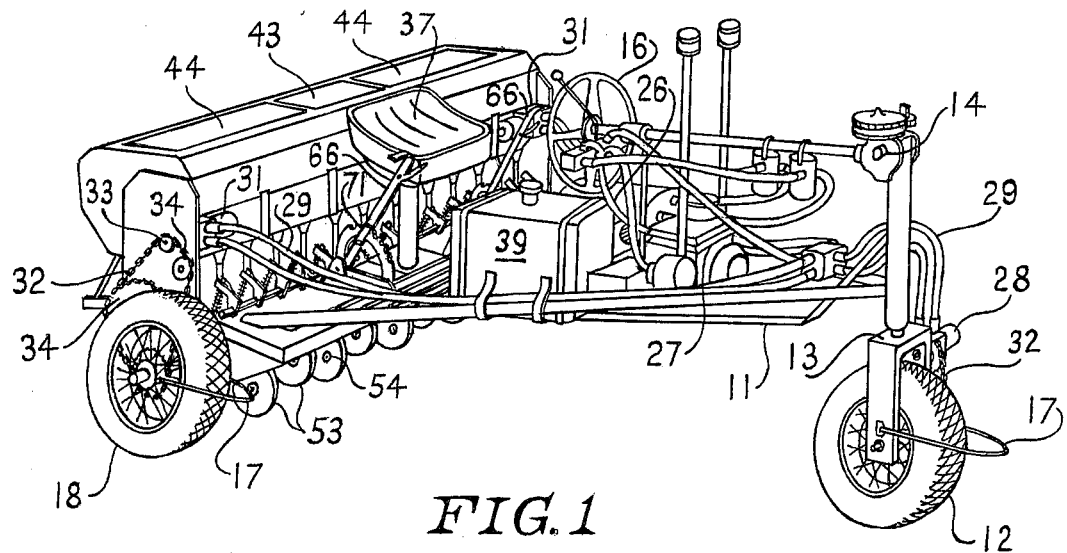
FIG. 1 is a perspective view from the right front side of apparatus used to perform the present invention.

The apparatus shown in FIGS. 1-4 will be first described, it being understood that this apparatus is an adaptation of certain standard agricultural equipment and considerable variation in structure may be employed. A vehicle frame 11 of generally triangular shape in plan is provided and is so constructed as to be easily maneuverable so as to make tight turns at the ends of a field and the frame 11 is supported above the ground at an elevation to pass over standing wheat without unduly bending same and therefore the wheat will stand up. The frame 11 is preferably supported by a tripod arrangement. The front wheel 12 is of a wire motorcyle wheel type and is provided with a rubber tire. Mounting 13 supports the front end of the frame 11 from the front wheel 12 and is provided with a steering mechanism 14 for steering about a vertical axis under control of a steering wheel 16 adjacent the operator's seat and adjacent the other manual controls for the vehicle. A curved wire grain guard 17 extends forwardly around the front of the wheel 12 to divert grain from the wheel and to prevent the grain from being entangled in the drive mechanism for wheel 12 hereinafter explained. Similar grain guards 17 are provided around the rear wheels 18 on either side of the rear of the frame 11. Each rear wheel 18 is supported by an axle 19 which is attached to frame 11 by a depending support 21.

Mounted on frame 11 is a prime mover such as a gasoline engine 26 which drives a hydraulic pump 27. Front wheel 12 is turned by a front wheel hydraulic motor 28 connected to pump 27 by hoses 29. The motor 28 drives the wheel 12 by a chain 32. Each rear wheel 18 is driven by an individual hydraulic motor 31 which has a pinion sprocket 33 connected thereto driving a chain 32. Idler sprockets 34 are interposed and a wheel sprocket 36 is connected to drive each wheel 18. Although not illustrated and described, nevertheless it will be understood that a differential mounting between wheel sprocket 36 and wheels 18 may be provided to permit the vehicle to turn with facility.

Centrally of frame 11 is an operator's seat 37 and forwardly of seat 37 is platform 38 on which the operator may stand to maneuver the vehicle. A fuel tank 39 and a hydraulic fluid tank 40 and a central fluid cooler 45 are suitably located on frame 11. This arrangement and suitable control valves function to drive the apparatus.

Extending horizontally transversely and supported by frame 11 is grain drill hopper 41 mounted above frame 11 by mounting brackets 42. The seeds are filled into the hopper 41, there being a center lid 43 and two side lids 44 for such purpose. The bottom 46 of hopper 41 is provided with openings 47 preferably transversely spaced about 7 inches apart, this being the common distance between adjacent rows of wheat in the Mid-West. Horizontal transverse shaft 48 is located slightly below the bottom 46 and immediately below the openings 47. Shaft 48 is driven by sprocket 34 or other convenient means in such manner that the rotation of shaft 48 is timed to the movement of the vehicle over the ground. Compartmented wheels 49 on shaft 48 control feed of seed through openings 47. A funnel shaped element 51 extends below bottom 46 in registry with each opening 47.

Attached to each element 51 is a flexible tube 52. The function of wheel 49 is to feed seeds 78 from the hopper 41 through funnel element 51 and into tube 52 in a manner well understood in the seed drill art. The seeds are fed at a rate to space the same apart in the furrow a proper distance. One well-known means to control the rate of feed on seeds employs a large, multi-part bevel gear designated generally by reference numeral 58 and engaged by a pinion at any selected location to vary the speed of turning of shaft 48. since this mechanism is well-known in grain drills it is not illustrated in detail.

Figure 2:
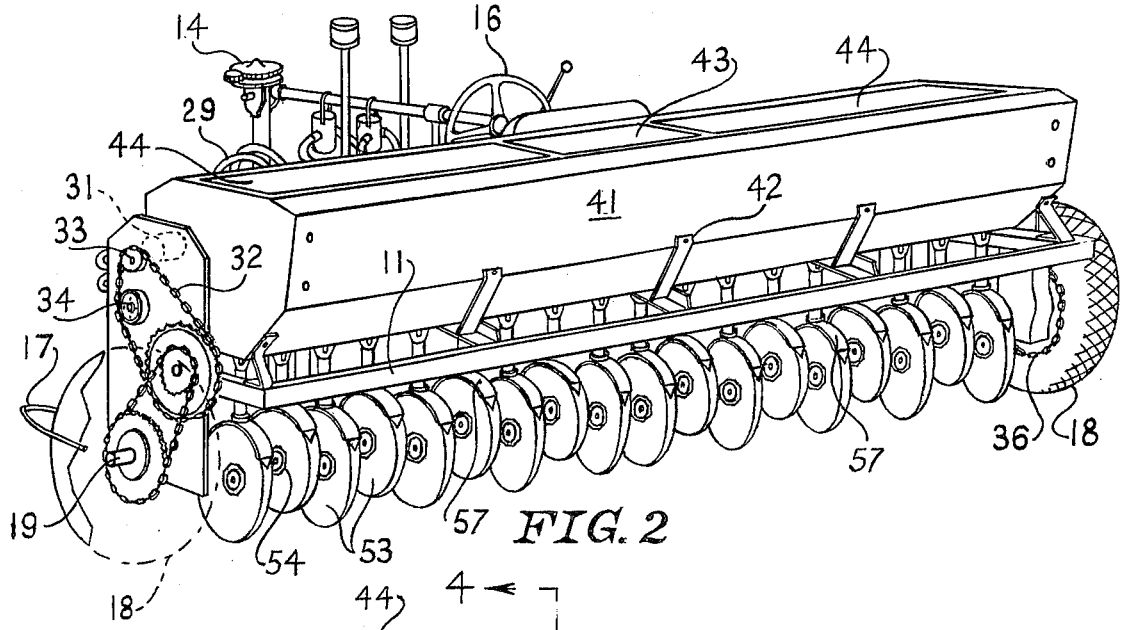
FIG. 2 is a perspective view from the left rear.
Figure 3:
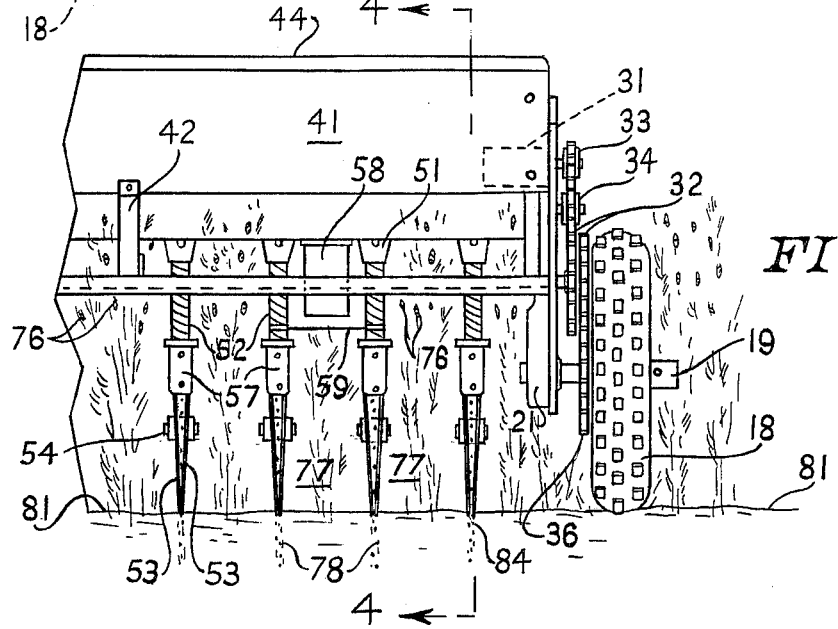
FIG. 3 is an enlarged fragmentary rear elevational view of a portion of the apparatus.
Figure 4:
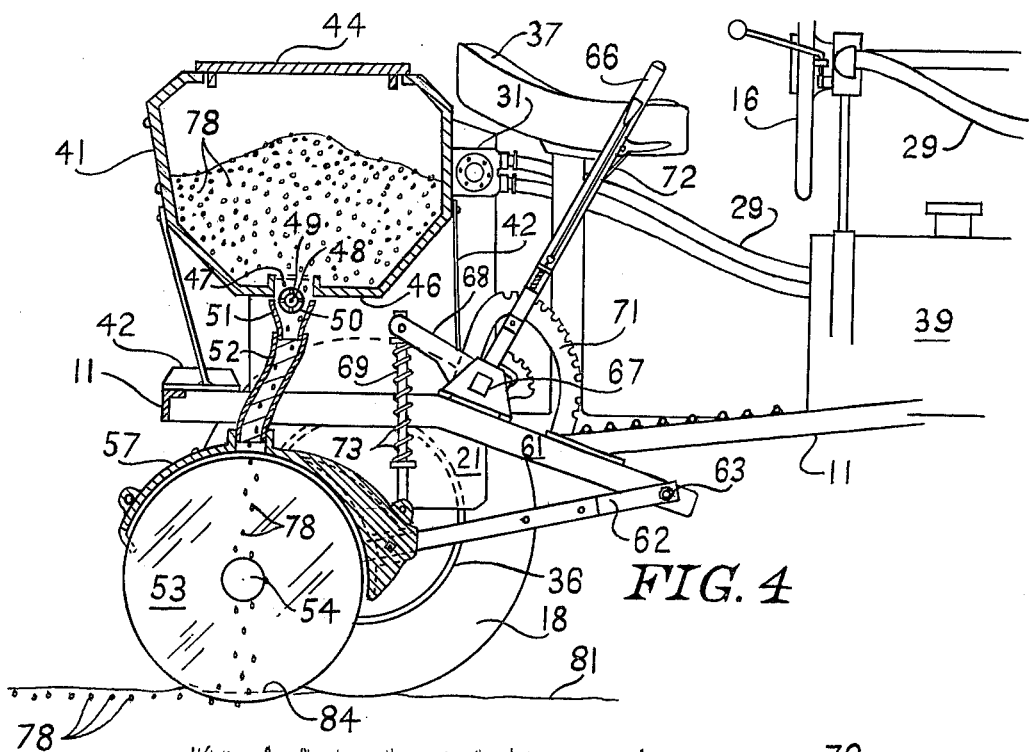
FIG. 4 is a further enlarged vertical sectional view taken substantially along the line 4—4 of FIG. 3.

Mounted by means hereinafter explained below each tube 52 is a pair of discs 58 similar to harrow discs. As best shown in FIG. 3, the pairs of discs 53 are mounted on individual axles 54 so that the discs 53 converge downwardly. In other words the spacing between the discs 53 is small at the bottom and wide at the top, the bearings 56 on axle 54 mounting the discs 53 for such purpose. A cover 57 encloses the space at the top of the discs 53 and is provided with an opening into which the tube 52 discharges. Adjacent pairs of discs are preferably staggered as best shown in FIG. 2.

The depth of the slits in the soil formed by discs 53 is controlled. Thus, disc support brackets 61 extend forwardly from the rear end of frame 11 and arms 62 are pivoted to the forward ends of brackets 61 by means of horizontal transverse pivots 63. Mounted in proximity to the operator's seat on either side of the vehicle, is handle 66, the handles 66 being fixed at their lower ends to shafts 67 mounted on brackets 61. A plurality of cranks 68 turn with shaft 67, one for each pair of discs 53. Adjacent handle 66 is a ratchet segment 71 which is engaged by a pawl (not shown) which is in turn controlled by a latch arm 72. The position of handle 66 and hence of cranks 68 is controlled by the latch arm 72 relative to the ratchet segment 71. Pivoted to the rear (outer) end of each crank 68 is a rod 69, the lower end of which is pivoted to one of covers 57. Spring 73 surrounding rod 69 biases crank clockwise as viewed in FIGS. 4 and 7. To prevent crop 77 from being entangled in gears 58, a wire 59 interconnects adjacent tubes to either side of gears 58 at an elevation just below gears 58. Wire 59 tends to bend down the top of crop 77 away from gears 58.

OPERATION

Figure 5:
FIG. 5 is a schematic view showing a portion of a field in which wheat and soybeans have been planted, the condition being prior to harvesting of the wheat.

The operation of the apparatus heretofore described and the method of the present invention will next be described. Wheat seeds are planted in a conventional manner. In the Mid-Western part of the United States winter wheat is planted in the Fall before the snow. In the Spring it begins to grow. In FIG. 5 is shown wheat 76 having stems 77 in long rows in a field. The apparatus heretofore described is used to plant soybean seeds 78 in rows parallel to and preferably mid-way between the rows of stems 77. A preferred time for such planting is about June 1st. The bean plants 79 shown in FIG. 5 are grown from the seeds 78 planted in the ground 81, being protected from weeds by the wheat 76. The bean plants 79 are partially matured.

Figure 6:
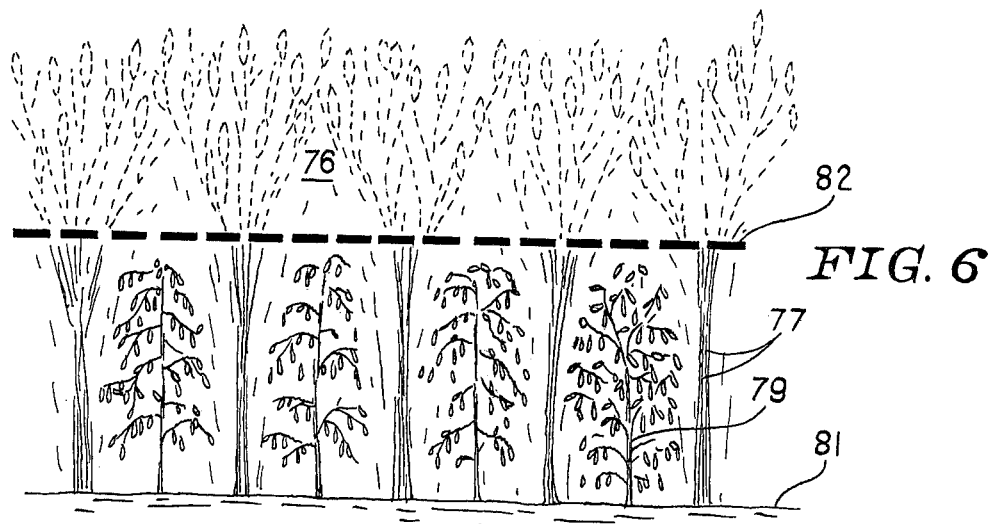
FIG. 6 is a view similar to FIG. 5 showing in dot and dash lines the location of the wheat prior to its harvesting.

About July 4, the wheat 76 is harvested using a conventional combine. As shown in FIG. 6 the level 82 at which the combine cuts is above the top of the bean plants 79. These plants are large enough to prevent weed growth by shading the weed seeds. When the plants 79 have fully grown, they are harvested in conventional manner.

The planting of the seeds 78 is best shown in FIG. 5. Thus, the pairs of discs 53 form a slit 84 in the soil 81 between the rows 77 of the wheat crop. The seeds 78 drop from the tube 52 into the gap between the discs 53 and hence fall into the slit 81 and such slit is closed by the discs 53 after the seeds have been deposited. Although crop 77 is disturbed by passage of the apparatus, its elevation is high enough so that the crop will return to upright position.

What is claimed is:

1. Apparatus for planting seeds between rows of growing grain comprising a frame, three wheels supporting said frame above the ground, said wheels comprising a front wheel and a pair of rear wheels, the distance measured transversly to the direction of movement of said apparatus between said front wheel and either of said rear wheels being a distance which is an even multiple of the distance "x" between conventionally planted rows of grain, the widths of said wheels being less than "x", and which futher comprises first wheel mounting means on the front of said frame for turning said front wheel relative to a vertical axis, a steering mechanism for said first wheel mounting means to steer said apparatus and second wheel mounting means for each of said rear wheels, a hydraulic motor for each said wheels, a prime mover on said frame, a pump driven by said prime mover, and control means for driving each of said motors from said pump, a drill on said frame having a hopper extending transversely of said frame formed on its bottom with a plurality of apertures, seed discharge means for releasing seeds from said hopper at spaced intervals through said apertures, and for each of said apertures a tube supported by and depending from said hopper receiving seeds discharged through said apertures, said second wheel mounting means being connected to the outer ends of said hopper, and planting means on the lower end of said tube for planting said planting means comprising a separate axle for each said tube, bearing means supporting said axle from said frame, pair of discs having their axes transverse to the direction of movement of said frame, said discs being rotatable on said axle mounted so that said discs are downwardly converging with a gap between the top edges of said discs, a cover for said gap, said tube discharging seeds through said cover and into said gap, said discs being laterally separated from each other by a distance "x" and offset laterally from each said wheel a multiple of "x", said hopper and all transversely extending portions of said apparatus below said hopper being elevated above the ground a distance at least equal to the height of grain which has been planted before the winter and allowed to grow until about June 1.

2. Apparatus according to claim 1 which further comprises means under the control of the operator of said apparatus for raising and lowering said axle relative to said frame to control the depth of planting of said seeds.

* * * * *